Figure 4:
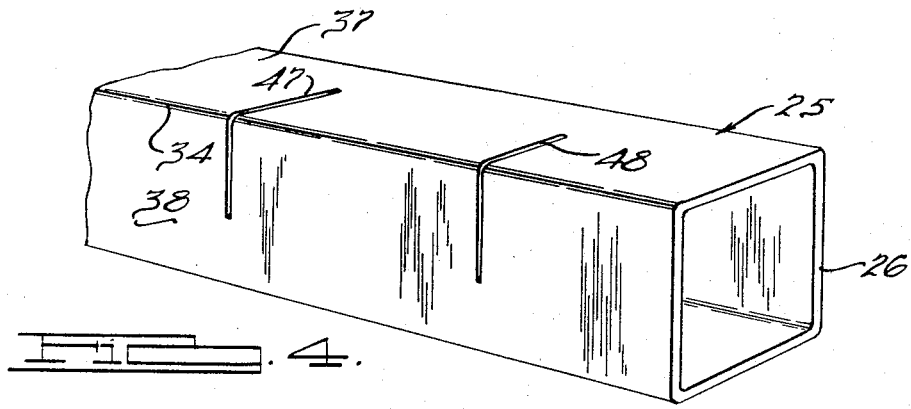

June 27, 1967      E. PATCH      3,327,648
FREIGHT BRACING DEVICE
Filed June 22, 1965      2 Sheets-Sheet 1
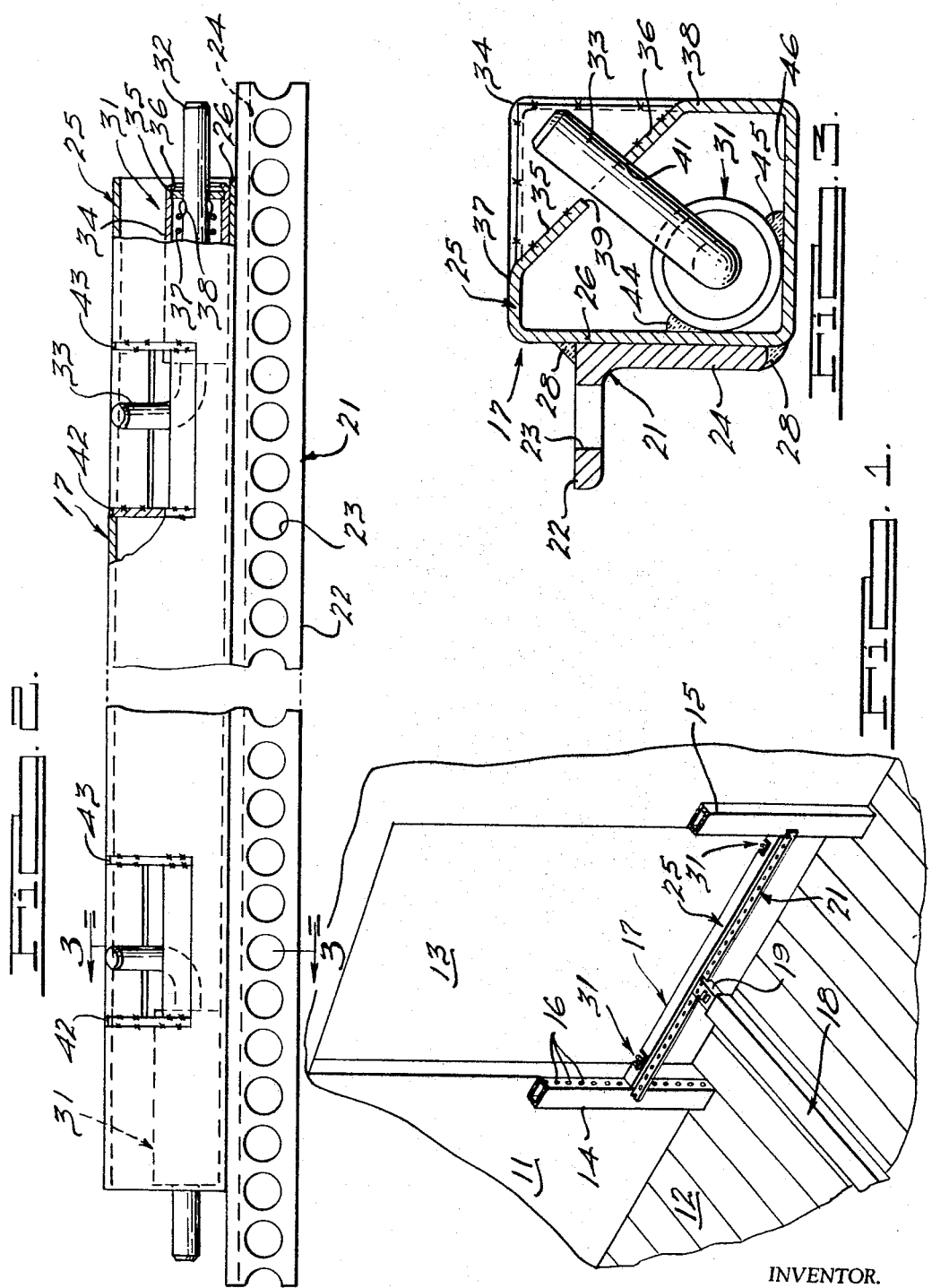
INVENTOR.
Edward Patch.
BY
Harness, Dickey & Pierce
ATTORNEYS.

INVENTOR.
Edward Patch
BY
Harness, Dickey & Pierce
ATTORNEYS.

United States Patent Office 3,327,648
Patented June 27, 1967

3,327,648
FREIGHT BRACING DEVICE
Edward Patch, Dearborn Heights, Mich., assignor to Evans Products Company, a corporation of Delaware
Filed June 22, 1965, Ser. No. 465,851
6 Claims. (Cl. 105—369)

This invention relates to a freight bracing device for bracing freight within a railway car or the like and more particularly to a freight bracing member adapted to span a doorway opening and to an end latch and method for making the end latch for such a member.

It has been common practice in the shipment of freight by railway cars or other vehicles to employ a freight bracing cross bar that extends between opposing sides of the transporting vehicle to brace freight within the vehicle. Conventionally such vehicles are provided with access door openings in the side walls to permit freight to be loaded into the vehicle. In order to make full use of the length of the vehicle, it is desirable to provide some manner for attaching the cross bars to the space between the doorways. Normally, this has been accomplished by the use of a doorway member that is affixed to the vehicle and spans the doorway. It is essential that the doorway member be light so that it can be conveniently inserted and withdrawn by a single operator but it also must be sufficiently rigid to support the cross bars without deflection.

Certain types of vehicles have oversize doors that are wider than a standard door. The doorway members which span these wider doors must be of considerable length and it has heretofore been a common practice to support these doorway members intermediate their length to preclude deflection thereof. The additional, intermediate supports obstruct the doorway and must be removed before the doorway can be utilized. Because they are extra pieces they also add to the cost of the assembly.

It is, therefore, a principal object of this invention to provide a doorway member for a freight bracing device that may span a wide doorway but does not require additional support intermediate its ends.

It is additionally desirable to provide separate latch means at each end of the doorway member so that it may be attached to support members at each end and removed therefrom by a single operator positioned at either end of the doorway member. The latch devices, however, must be simple in construction and yet protected from damage due to shifting of the cargo within the transporting vehicle.

It is, therefore, a further object of this invention to provide an improved latch device for a freight bracing device.

It is a still further object of this invention to provide an improved method for construction of a latch device for a freight bracing member.

A freight bracing device embodying this invention is adapted to span a pair of support members to provide means for attaching a cross bar or the like between the support members. The freight bracing device comprises a structural member provided with a plurality of spaced attaching means along its length for attachment of a cross bar or the like thereto. A reinforcing member is affixed to the structural member to resist bending thereof for supporting the cross bars between the support members without additional support for the freight bracing device between its ends. Means are provided at each end of the freight bracing device for its attachment to the respective support member.

An end latch for a freight bracing device embodying this invention and adapted to be used in a doorway member of the type described above comprises a hollow tubular reinforcing member. A latch device is supported within the end of the reinforcing member and includes a latching means adapted to extend from the end of the reinforcing member when in its engaged position. An access opening is formed in a side wall of the reinforcing member and latch release means for the latching means extends through the access opening.

Figure 5:
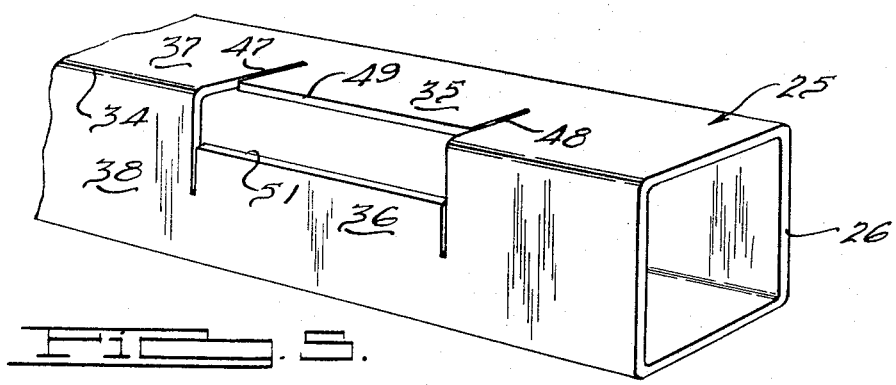
Figure 6:
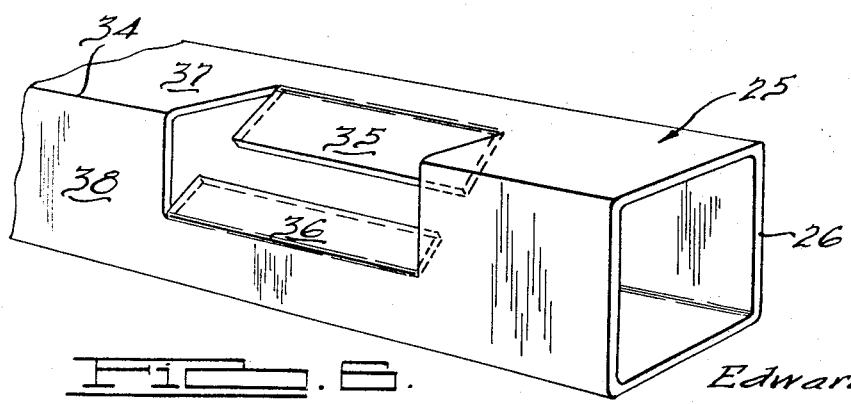

Other objects and advantages of this invention will become more apparent at this description proceeds, particularly when considered in conjunction with the accompanying drawings, wherein:

FIGURE 1 is a perspective view of a portion of a railway car embodying this invention;
FIGURE 2 is a top plan view of the doorway member shown in FIGURE 1;
FIGURE 3 is a cross-sectional view taken along the line 3—3 of FIGURE 2; and
FIGURES 4 through 6 are perspective views showing the steps of forming a reinforcing member to receive a latch.

Referring now in detail to FIGURE 1, a railway car embodying this invention is shown partially and includes a side wall 11 and floor 12 which in part define a freight storage area. A doorway 13 is formed in the side wall 11 to permit access to the storage area. The doorway 13 is substantially wider than a conventional railway car doorway, for example, its width may be 12 feet or more. A pair of vertically extending support members 14 and 15 are provided at each side of the doorway 13. The support members 14 and 15 may comprise a portion of the frame of the side wall 11 or may be separate members that are affixed in any suitable manner to the railway car. A plurality of spaced vertically disposed openings 16 are provided in each of the support members 14 and 15.

A doorway member, indicated generally by the reference numeral 17 and shown in more detail in the remaining figures, is adapted to be supported at each of its ends by the support members 14 and 15. One or more crossbar assemblies 18 (only one being shown) are affixed to the doorway member 17 to brace freight within the storage area. The crossbar assembly 18 has an end fitting 19 that is adapted to coact with attaching means provided by the doorway member 17 so that the crossbar assembly 18 may be detachably coupled to the doorway member 17 at any desired position along its length.

Referring now additionally to FIGURES 2 and 3, the doorway member 17 consists of a structural angle 21 having its short leg 22 extending longitudinally of the doorway member 17 and inwardly of the storage area. A plurality of equally spaced circular apertures 23 are provided along the length of the leg 22 for attachment of the crossbar end fitting 19 thereto in a known manner.

Due to the extreme length of the doorway 13, the structural angle 21 does not have sufficient strength in and of itself to resist bending under the weight of one or more crossbar assemblies. To preclude such bending without the provision of additional intemediate support for the doorway member 17 the long leg 24 of the structural angle 21 is affixed, as by welding, to a longitudinally extending hollow tubular member 25. In the preferred embodiment of the invention, the tubular member 25 is of a square box-shaped section, and the leg 24 is welded to one side 26 of the reinforcing member 25, as by the welds 28. It will be noted that the structural angle 21 is slightly longer than the reinforcing member 25 so that it may cooperate with belt rails (now shown) positioned along the side wall 11 adjacent the doorway 13 to provide a continuous attaching means for the crossbar assemblies 18 along the length of the railway car.

A latch assembly 31 is provided at each end of the doorway member 17 for attachment to the respective support members 14 and 15. Since each of the latch assemblies 31 is identical in construction, only one will be described in detail. The latch assembly 31 comprises an L-shaped locking pin having a locking end 32 that is adapted to be inserted into the apertures 16 of the support members 14 and 15 and a shorter release end 33. The locking end 32 is slidably supported in a cylindrical housing 34. The outer end of the housing 34 is closed by a plate 35 which is affixed to the housing 34 by an upset end portion 36. A coil spring 37 engages a similar closure at the opposite end of the latch housing 37 and a series of outwardly tabs 38 formed on the locking portion 32 to normally urge the locking portion 32 outwardly with respect to the supporting housing 34 for engagement with the support members 14 and 15.

The latch device 31 is contained within the tubular reinforcing member 25 and protected by it. It will be noted (FIGURE 3) that the release arm 33 extends toward one vertex 34 of the box-shaped reinforcing member 25 but terminates inwardly of it. The release arm 33 extends between a pair of inwardly depressed tabs 35 and 36 formed in the legs 37 and 38 which define the vertex 34. The tabs 35 and 36 are cut off, as at 39 and 41 to form an access opening through which the release arm 33 extends. The tabs 39 and 41 provide some centering action to limit the rotation of the latch member 32. A pair of triangular gussets 42 and 43 are welded at each end of the tabs 35 and 36 to the tabs 35 and 36 as well as to the legs 37 and 38 as shown by the X's. The housing 34 is welded, as at 44 and 45 to the leg 26 and a remaining leg 46 of the reinforcing member 25.

The method of forming the end of the tubular reinforcing member 25 for receipt of the latch device 31 will now be described by particular reference to FIGURES 4 through 6. It is to be understood that each end of the reinforcing member 25 is formed in the same manner to receive the respective latch device. The tubular reinforcing member 25 is slit, as at 47 and 48, through the vertex 34 and into the legs 37 and 38 at spaced locations and adjacent the end (FIGURE 4). The legs 37 and 38 are then cut, as at 49 and 51, between the slits 47 and 48 and intersecting them along the length of the reinforcing member 25 (FIGURE 5). It will be noted that the cuts 49 and 51 are not formed at the ends of the slits 47 and 48 but are displaced toward the vertex 34. As a result of the cuts 49 and 51 and slits 47 and 48 an angular piece of the tubular member 25 is removed from around the vertex 34. The slits 47 and 48 and cuts 49 and 51 result in the formation of the tabs 35 and 36 which are then deflected inwardly toward the center of the tubular member 25 (FIGURE 6) to provide the opening through which the latch release arm 33 extends.

The latch assembly 31 is then inserted into the open end of the tubular reinforcing member 25 with the latch release arm 33 extending from between the tabs 35 and 36 inwardly of the vertex 34 whereby it will be protected, as has been previously noted. The gussets 42 and 43 may then be welded in place.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A freight bracing device adapted to span a pair of support members to provide means for attaching a cross bar or the like between the support members comprising a structural member providing a plurality of spaced attaching means along the length of said device for attachment of a cross bar or the like thereto, a hollow tubular reinforcing member fixed to said structural member to resist bending thereof for supporting the cross bars between the support members without additional support for said freight bracing device along its length, and means at each end of said freight bracing device for attachment thereof to the respective supporting member, at least one of said last named means comprising a latch device including a latching means adapted to extend from an end of said reinforcing member when in its engaged position with the supporting member, means supporting said latching means within the hollow interior of said reinforcing member for movement from said engaged position to a disengaged position, an access opening formed in a side wall of said reinforcing member formed by a pair of inwardly depressed tabs and release means for said latching means extending through said access opening, said release means terminating inwardly of the periphery of said reinforcing member for protection of said release means and said latch device by said reinforcing member, said release means being centered by said tabs.

2. A freight bracing device adapted to span a pair of support members to provide means for attaching a cross bar or the like between the support members comprising a structural angle, a plurality of longitudinally spaced apertures in one leg of said structural angle for attachment of the cross bar or the like thereto, a hollow box-shaped reinforcing member affixed to the other leg of said structural angle to resist bending of said structural angle for supporting the cross bar between the support members without additional support for said freight bracing device along its length, and means at each end of said freight bracing device for attachment thereof to the respective support member, at least one of said last named means comprising a latch device including a latching means adapted to extend from an end of said reinforcing member when in its engaged position with the support member, means supporting said latching means within the hollow interior of said reinforcing member for movement from said engaged position to a disengaged position, an access opening in a side wall of said reinforcing member at a vertex of said reinforcing member formed by a pair of inwardly depressed tabs and release means for said latching means extending through said opening toward said vertex, said release means terminating inwardly of said vertex for protection of said release means and said latch device by said reinforcing member, said release means being centered by said tabs.

3. An end latch for a freight bracing device comprising a hollow tubular reinforcing member, a latch device including a latch means adapted to extend from an end of said reinforcing member when in its engaged position, means supporting said latch means within the hollow interior of said reinforcing member for movement from said engaged position to a disengaged position, an access opening in a side wall of said reinforcing member formed by a pair of inwardly depressed tabs, and release means for said latch means extending through said access opening, said release means terminating inwardly of the periphery of said reinforcing member for protection of said release means and said latch device by said reinforcing member, said release means being centered by said tabs.

4. An end latch for a freight bracing device comprising a hollow tubular reinforcing member, a latch device including a latching means adapted to extend from an end of said reinforcing member when in its engaged position, means supporting said latching means within the hollow interior of said reinforcing member for movement from said engaged position to a disengaged position, an access opening in a side wall of said reinforcing member formed by a pair of inwardly depressed tabs, and release means for said latch means extending through said access opening, said release means being centered by said tabs.

5. An end latch for a freight bracing device comprising a hollow rectangular shaped reinforcing member, a latch device including a latching means adapted to extend from an end of said reinforcing member when in its engaged position, means supporting said latching means within the hollow interior of said reinforcing member for movement from said engaged position to a disengaged position, an access opening in said reinforcing member in alignment with one of its vertices formed by a pair of inwardly depressed tabs, and release means for said latching means extending through said access opening, said release means terminating inwardly of said vertex for protection of said release means and said latch device by said reinforcing member, said release means being centered by said tabs.

6. An end latch for a freight bracing device comprising a hollow box-shaped reinforcing member, a latch device including a latching means adapted to extend from an end of said reinforcing member when in its engaged position, means supporting said latching means within the hollow interior of said reinforcing member for movement from said engaged position to a disengaged position, an access opening in said reinforcing member in alignment with one of its vertices formed by an inwardly depressed tab of each leg of said vertex, and release means for said latching means extending through said access opening, said release means being centered by said tabs.

References Cited
UNITED STATES PATENTS

| | | | |
|---|---|---|---|
| 2,994,285 | 8/1961 | Dunlap | 105—369 |
| 3,063,387 | 11/1962 | Schroeder et al. | 105—369 |
| 3,117,532 | 1/1964 | Moorhead | 105—369 |
| 3,151,571 | 10/1964 | Heard | 105—369 |
| 3,227,102 | 1/1966 | Shook | 105—369 |

ARTHUR L. LA POINT, *Primary Examiner.*

DRAYTON E. HOFFMAN, *Examiner.*